United States Patent
Inbaraj et al.

(10) Patent No.: US 9,843,548 B2
(45) Date of Patent: Dec. 12, 2017

(54) SYSTEM AND METHOD OF USER-TO-MACHINE AND MACHINE-TO-MACHINE COMMUNICATION THROUGH INSTANT MESSAGING

(71) Applicant: AMERICAN MEGATRENDS, INC., Norcross, GA (US)

(72) Inventors: Joseprabu Inbaraj, Suwanee, GA (US); Chandrasekar Rathineswaran, Duluth, GA (US)

(73) Assignee: AMERICAN MEGATRENDS, INC., Norcross, GA (US)

( * ) Notice: Subject to any disclaimer, the term of this patent is extended or adjusted under 35 U.S.C. 154(b) by 183 days.

(21) Appl. No.: 14/564,784

(22) Filed: Dec. 9, 2014

(65) Prior Publication Data

US 2016/0164818 A1    Jun. 9, 2016

(51) Int. Cl.
*H04L 12/58*    (2006.01)

(52) U.S. Cl.
CPC ............ *H04L 51/18* (2013.01); *H04L 51/046* (2013.01)

(58) Field of Classification Search
CPC .......... H04L 51/18; H04L 51/04; H04L 12/58
See application file for complete search history.

(56) References Cited

U.S. PATENT DOCUMENTS

| | | | | |
|---|---|---|---|---|
| 9,009,230 | B1* | 4/2015 | Matthieu | H04L 67/12 709/204 |
| 2004/0174905 | A1* | 9/2004 | Caspi | H04L 12/2803 370/486 |
| 2007/0174405 | A1* | 7/2007 | Chen | H04L 51/18 709/207 |
| 2008/0140796 | A1* | 6/2008 | Solyanik | H04L 12/2818 709/207 |
| 2008/0183875 | A1* | 7/2008 | Nomura | G06F 9/5055 709/227 |
| 2014/0269513 | A1* | 9/2014 | Yu | H04L 67/00 370/328 |

\* cited by examiner

*Primary Examiner* — Kevin Bates
*Assistant Examiner* — Lesa Kennedy
(74) *Attorney, Agent, or Firm* — Locke Lord LLP; Tim Tingkang Xia, Esq.

(57) ABSTRACT

A system includes at least one first service device. Each first service device has one or more processors, a service instant messaging (IM) application, and at least one first service. The service IM application, when executed at the one or more processors of the at least one first service device, is configured to receive at least one command instant message, where the at least one command instant message comprises at least one first command associated with the at least one first service, extract the at least one first command from the at least one command instant message, and send the extracted first command to the at least one first service such that the at least one first service performs a corresponding first function based on the extracted first command.

16 Claims, 7 Drawing Sheets

SYSTEM AND METHOD OF USER-TO-MACHINE AND MACHINE-TO-MACHINE COMMUNICATION THROUGH INSTANT MESSAGING

FIELD

The present disclosure relates generally to user-to-machine and machine-to-machine interaction, and particularly to a system and method of user-to-machine and machine-to-machine communication through instant messaging (IM).

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

A user can control a device through an interface of the device onsite. When the user is offsite, the offsite user can also remotely control the device by logging-in to the interface of the device and performing certain services. However, the remotely control of the device may not be convenient for the user.

Therefore, an unaddressed need exists in the art to address the aforementioned deficiencies and inadequacies.

SUMMARY

In one aspect, the present disclosure relates to a system. The system includes at least one first service device. Each first service device has one or more processors, a service instant messaging (IM) application, and at least one first service. The service IM application, when executed at the one or more processors of the at least one first service device, is configured to:

receive at least one command instant message, wherein the at least one command instant message comprises at least one first command associated with the at least one first service;

extract the at least one first command from the at least one command instant message; and send the extracted first command to the at least one first service such that the at least one first service performs a corresponding first function based on the extracted first command.

In one embodiment, the service IM application receives the command instant message from at least one IM server via a network.

In one embodiment, the service IM application, when executed, is further configured to:

verify the command instant message based on the IM identifier of the command instant message;

receive a result from the at least one service performing the first function;

generate a result instant message comprising the result, wherein the result instant message is subject to be sent to a target device; and send the result instant message to the at least one IM server such that the at least one IM server sends the result instant message to the target device.

In one embodiment, the result includes at least one second command, and the target device is a second service device having a second service, such that the second service performs a corresponding second function based on the second command.

In one embodiment, the service IM application includes:

an IM user verification module, configured to verify the command instant message based on the IM identifier of the command instant message;

a command processing module, configured to extract the at least one first command from the command instant message and send the extracted first command to the at least one first service such that the at least one first service performs the corresponding first function based on the extracted first command; and a service IM processing module, configured to receive the at least one command instant message, receive the result, generate the result instant message, and send the result instant message.

In one embodiment, the system further includes at least one client device. Each client device has one or more processors and an IM application. The IM application, when executed at the one or more processors of the client device, is configured to:

provide a user interface configured to receive the at least one command;

prepare the command instant message;
send the command instant message;
receive the result instant message;
retrieve the result from the result instant message.
In one embodiment, the IM application includes:
a user interface module, configured to provide the user interface; and an IM processing module, configured to prepare the command instant message, send the command instant message, receive the result instant message, and retrieve the result from the result instant message.

In one embodiment, the at least one first service includes management of IPMI, or management of combined SNMP and shell functions.

In another aspect, the present disclosure relates to a method of performing instant messaging (IM) based communication in a system. The method includes:

receiving, at a service IM application being executed at a service device, a command instant message, wherein the command instant message comprises at least one first command associated with at least one first service of the service device;

extracting, at the service IM application, the at least one first command from the command instant message; and sending, by the service IM application, the extracted first command to the at least one first service such that the at least one first service performs a corresponding first function based on the extracted first command.

In one embodiment, the method further includes:
verifying, at the service IM application, the command instant message based on the IM identifier of the command instant message;

receiving a result from the at least one service performing the first function;

generating a result instant message comprising the result, wherein the result instant message is subject to be sent to a target device; and sending the result instant message to at least one IM server such that the IM server sends the result instant message to the target device.

In one embodiment, the result includes at least one second command, and the target device is a second service device having a second service, such that the second service performs a corresponding second function based on the second command.

In one embodiment, the service IM application includes:

an IM user verification module, configured to verify the command instant message based on the IM identifier of the command instant message;

a command processing module, configured to extract the at least one first command from the command instant message and send the extracted first command to the at least one first service such that the at least one first service performs the corresponding first function based on the extracted first command; and a service IM processing module, configured to receive the at least one command instant message, receive the result, generate the result instant message, and send the result instant message.

In one embodiment, the system further includes at least one client device. Each client device has one or more processors and an IM application. The IM application, when executed at the one or more processors of the client device, is configured to:

provide a user interface configured to receive the at least one command;

prepare the command instant message;

send the command instant message;

receive the result instant message; and retrieve the result from the result instant message.

In one embodiment, the IM application includes:

a user interface module, configured to provide the user interface; and an IM processing module, configured to prepare the command instant message, send the command instant message, receive the result instant message, and retrieve the result from the result instant message.

In a further aspect, the present disclosure relates to a non-transitory computer readable medium storing computer executable code. The code, when executed at one or more processors of a first service device, is configured to:

receive a command instant message, wherein the command instant message comprises at least one first command associated with at least one first service of the first service device;

extract the at least one command from the command instant message; and send the extracted first command to the at least one first service such that the at least one first service performs a corresponding first function based on the extracted first command.

In one embodiment, the code, when executed at the one or more processors of the first service device, is further configured to:

verify the command instant message based on the IM identifier of the command instant message;

receive a result from the at least one service performing the first function;

generate an result instant message comprising the first result, wherein the result instant message is subject to be sent to a target device; and send the result instant message to at least one IM server such that the IM server sends the result instant message to the target device.

In one embodiment, the result includes at least one second command, and the target device is a second service device having a second service, such that the second service performs a corresponding second function based on the second command.

In one embodiment, the code includes:

an IM user verification module, configured to verify the command instant message based on the IM identifier of the command instant message;

a command processing module, configured to extract the at least one first command from the command instant message and send the extracted first command to the at least one first service such that the at least one first service performs the corresponding first function based on the extracted command; and a service IM processing module, configured to receive the command instant message, receive the result, generate the result instant message and send the result instant message.

In one embodiment, the first service device is remotely connected to at least one client device through a network. Each client device has one or more processors and an IM application. The IM application, when executed at the one or more processors of the client device, is configured to:

provide a user interface configured to receive the at least one command;

prepare the command instant message;

send the command instant message;

receive the result instant message; and receive the result from the result instant message.

In one embodiment, the IM application includes:

a user interface module, configure to provide the user interface; and an IM processing module, configured to prepare the command instant message, send the command instant message, receive the result instant message, and retrieve the result from the result instant message.

These and other aspects of the present disclosure will become apparent from the following description of the preferred embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the detailed description and the accompanying drawings.

DETAILED DESCRIPTION

Figure 1A:
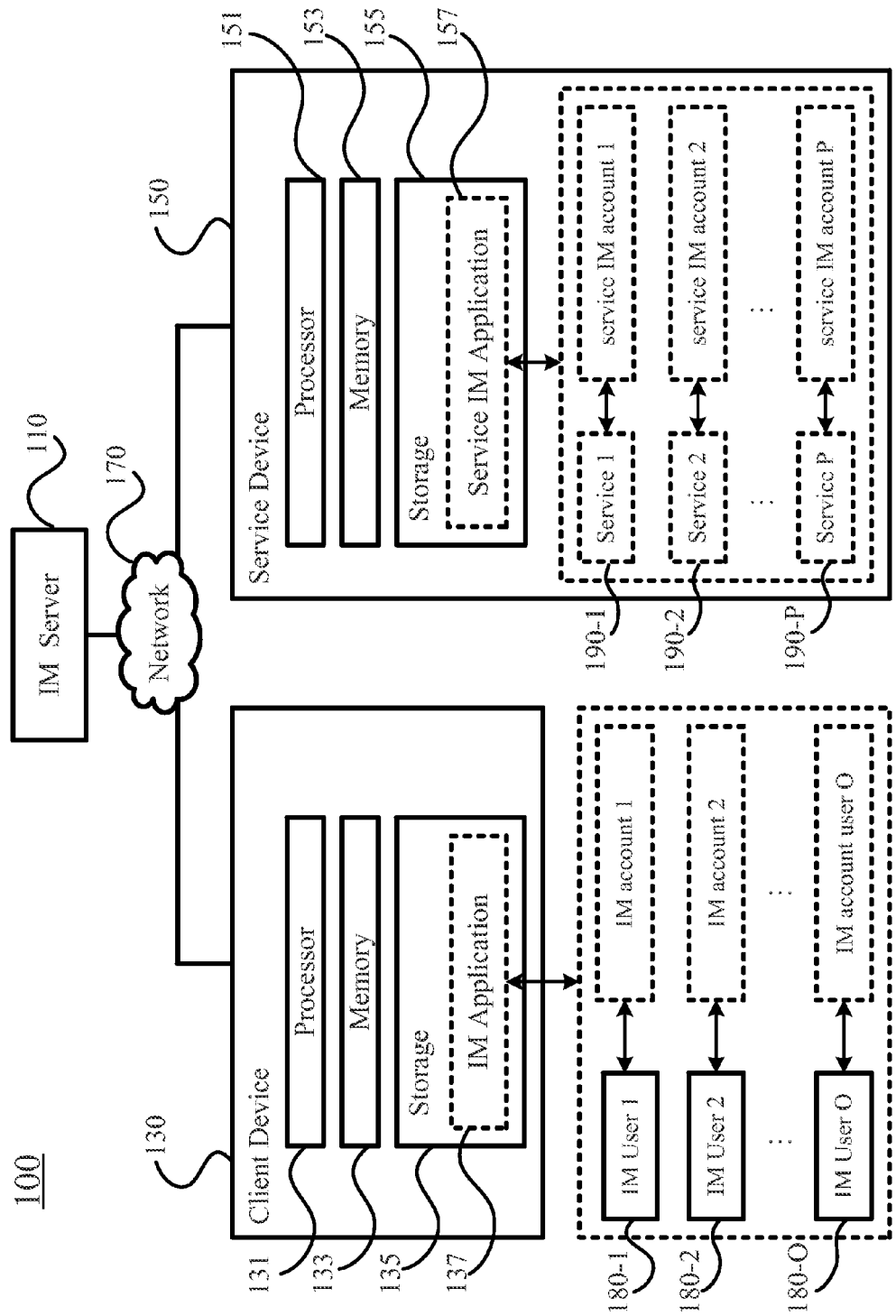
FIG. 1A schematically depicts a system for interacting with devices based on instant messaging (IM) according to certain embodiments of the present disclosure.

The present disclosure is more particularly described in the following examples that are intended as illustrative only since numerous modifications and variations therein will be apparent to those skilled in the art. Various embodiments of the disclosure are now described in detail. Referring to the drawings, like numbers, if any, indicate like components throughout the views. As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise. Moreover, titles or subtitles may be used in the specification for the convenience of a reader, which shall have no influence on the scope of the present disclosure. Additionally, some terms used in this specification are more specifically defined below.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and in no way limits the scope and meaning of the disclosure or of any exemplified term. Likewise, the disclosure is not limited to various embodiments given in this specification.

Unless otherwise defined, all technical and scientific terms used herein have the same meaning as commonly understood by one of ordinary skill in the art to which this disclosure pertains. In the case of conflict, the present document, including definitions will control.

As used herein, "around", "about" or "approximately" shall generally mean within 20 percent, preferably within 10 percent, and more preferably within 5 percent of a given value or range. Numerical quantities given herein are approximate, meaning that the term "around", "about" or "approximately" can be inferred if not expressly stated.

As used herein, "plurality" means two or more.

As used herein, the terms "comprising," "including," "carrying," "having," "containing," "involving," and the like are to be understood to be open-ended, i.e., to mean including but not limited to.

As used herein, the term "module" may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The term "code", as used herein, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

As used herein, the term "headless system" or "headless machine" generally refers to the computer system or machine that has been configured to operate without a monitor (the missing "head"), keyboard, and mouse.

The term "interface", as used herein, generally refers to a communication tool or means at a point of interaction between components for performing data communication between the components. Generally, an interface may be applicable at the level of both hardware and software, and may be uni-directional or bi-directional interface. Examples of physical hardware interface may include electrical connectors, buses, ports, cables, terminals, and other I/O devices or components. The components in communication with the interface may be, for example, multiple components or peripheral devices of a computer system.

The terms "chip" or "computer chip", as used herein, generally refer to a hardware electronic component, and may refer to or include a small electronic circuit unit, also known as an integrated circuit (IC), or a combination of electronic circuits or ICs.

The term "instant messaging" or its abbreviation "IM" generally refers to a type of online chat which offers real-time text transmission between multiple parties or over the Internet. The term "IM user" generally refers to a party who is participating in the IM. In a typical IM, short messages are typically transmitted bi-directionally between two parties, when each user chooses to complete a thought and select "send." Some IM applications can use push technology to provide real-time text, which transmits messages character by character, as they are composed. More advanced instant messaging can add file transfer, clickable hyperlinks, Voice over IP, or video chat. Depending on the IM protocol, the technical architecture can be peer-to-peer (direct point-to-point transmission, also abbreviated as "P2P") or client-server (a central server retransmits messages from the sender to the receiver). An IM service includes any service that enables exchanges of message between authenticated users and prevents unauthorized users from transmitting messages, regardless of particular message formats, form factors, or communication pathways that may be used.

The present disclosure relates to computer systems. As depicted in the drawings, computer components may include physical hardware components, which are shown as solid line blocks, and virtual software components, which are shown as dashed line blocks. One of ordinary skill in the art would appreciate that, unless otherwise indicated, these computer components may be implemented in, but not limited to, the forms of software, firmware or hardware components, or a combination thereof.

The apparatuses and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

In one aspect, the present disclosure is related to a system of instant messaging (IM) based communication channel for interacting with devices.

FIG. 1A schematically depicts a system for interacting with devices based on IM according to certain embodiments of the present disclosure. As shown in FIG. 1A, the system 100 includes an IM server 110, a client device 130 and a service device 150. The client device 130 and the service device 150 are in communication with the IM server 110, for example, through a network 170. The network 170 may be a wired or wireless network, and may be of various forms such as a local area network (LAN) or wide area network (WAN) including, but not limited, to an intranet, an extranet, an internetwork, an Internet, a darknet, or any other network that allows for information communication, especially for instant messaging data transmission.

Figure 1B:
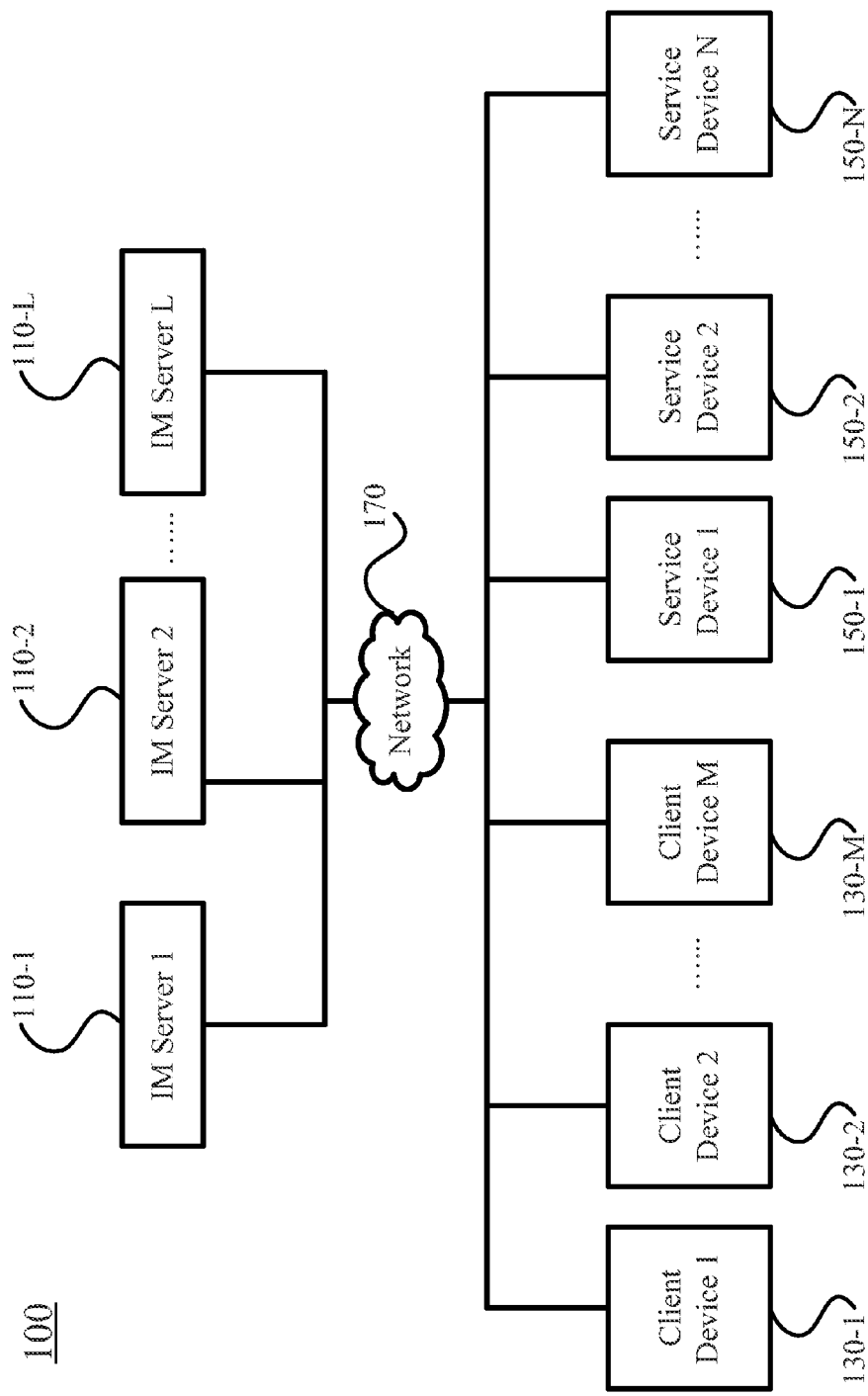
FIG. 1B schematically depicts a system for interacting with devices based on IM according to certain embodiments of the present disclosure.

In certain embodiments, the system 100 may include two or more IM servers 110, two or more client devices 130, and/or two or more service devices 150. FIG. 1B schematically depicts a system for interacting with devices based on IM according to certain embodiments of the present disclosure, where the system 100 may include a plurality of IM servers 110-1 to 110-L, a plurality of client devices 130-1 to 130-M, and a plurality of service devices 150-1 to 150-N, where L, M and N are positive integers. In other words, L IM servers 110, M client devices 130 and N service devices 150 are provided in the system 100 as shown in FIG. 1B. Each of the client devices 130 and each of the service devices 150 may communicate with each other through the IM servers 110 by sending and receiving instant messages. In certain embodiments, depending on the IM protocol, the technical architecture can be peer-to-peer (direct point-to-point transmission, also abbreviated as "P2P") or client-server (a central server retransmits messages from the sender to the receiver). For example, in a client-server architecture, the IM server 110 functions as a server, and the client device 130 and the service device 150 function as clients. In a peer-to-peer architecture, the IM server 110, the client device 130 and the service device 150 function as interconnected nodes (or "peers") such that any of the two interconnected nodes may communicate with each other through the P2P connection for IM. In this case, one of the service devices 150 may also send instant messages to another service device 150 by the P2P connection.

The IM server 110 may be one server (or, as shown in FIG. 1B, a plurality of servers) for providing IM services to both the client device 130 and the service device 150. For example, the client device 130 and the service device 150 may use the same IM server 110 for incoming and outgoing instant messages. In certain embodiments, the system 100 may include one IM server 110 as shown in FIG. 1A, and the client device 130 and the service device 150 may be in communication with the IM server 110. In certain embodiments, the system 100 may include a plurality of IM servers 110 as shown in FIG. 1B, and the client device 130 and the service device 150 may be in communication with different IM servers 110. In this case, the different IM servers 110 may communicate with each other directly, or through other IM servers, for example, via the network 170.

The client device 130 may be a computing device, such as a general purpose computer or a headless computer. In certain embodiments, the client device 130 may be a personal computer, a personal digital assistant (PDA), a mobile device, or any other devices that may be used for IM services. In certain embodiments, the client device 130 may be a system on chip (SoC). As shown in FIG. 1A, the client device 130 has a processor 131, a memory 133, a storage device 135, and any other necessary hardware components enabling the client device 130 to operate. In certain embodiments, the system 100 may include a plurality of client devices 130, as shown in FIG. 1B.

The processor 131 is configured to control operation of the client device 130. The processor 131 may execute an operation system or other applications of the storage 135. In certain embodiments, the storage 135 may run on more than one processor, such as two processors, four processors, eight processors, or any suitable number of processors.

The memory 133 may be a volatile memory, such as the random-access memory (RAM), for storing the data and information during the operation of the client device 130.

The storage 135 is a non-volatile data storage media for storing an operating system (OS) (not shown), an IM application 137, and other applications of the client device 130. The storage 135 may store the OS, the IM application 137, and any other necessary software or firmware components executable at the processor 131. In certain embodiments, the OS, the IM application 137, and any other necessary software or firmware components may be implemented as computer executable codes.

The IM application 137 may be an IM client application for one or more users to process with instant messages, such as receiving and/or sending instant messages. As shown in FIG. 1A, the IM application 137 is stored in the storage 135. Examples of the IM application 137 may include but not limited to MSN Messenger from Microsoft Corp., Messenger from Facebook, WhatsApp Messenger from WhatsApp Inc., WeChat and Tencent QQ from Tencent Holdings Limited, Google+ from Google, Skype from Microsoft, API of Twitter, AOL Instant Messenger from AOL INC. etc. In certain embodiments, the IM application 137 may be a part of the operating system (OS) of the client device 130 or a part of the firmware of the client device 130. In certain embodiments, the IM application 137 may be a web application, such as a web browser connected to a web-based IM website. Examples of the web-based IM website may include but not limited to imo.im, KoolIM, and eBuddy, etc., which may provide web-based one to one instant messaging or chatrooms. In certain embodiments, the IM application 137 may be a customized IM application specialized for the system 100. In certain embodiments, the client device 130 may include two or more different IM applications 137, where each of the two or more IM applications 137 may be used to process with instant messages.

As described above, the IM application 137 may be reached by one or more users, such as user 1 to user O as shown in FIG. 1A. Each of the users may have a specific IM identifier. In certain embodiments, the specific IM identifier may be a specific IM account of the user 180, such as a specific user name of the user 180. For example, each of the users 180-1, 180-2, . . . 180-O may have a specific user name of user1, user2, . . . userO. In certain embodiments, the user name of each user 180 may be in any random format, such as alphabet, numbers, or combinations thereof.

Figure 2:
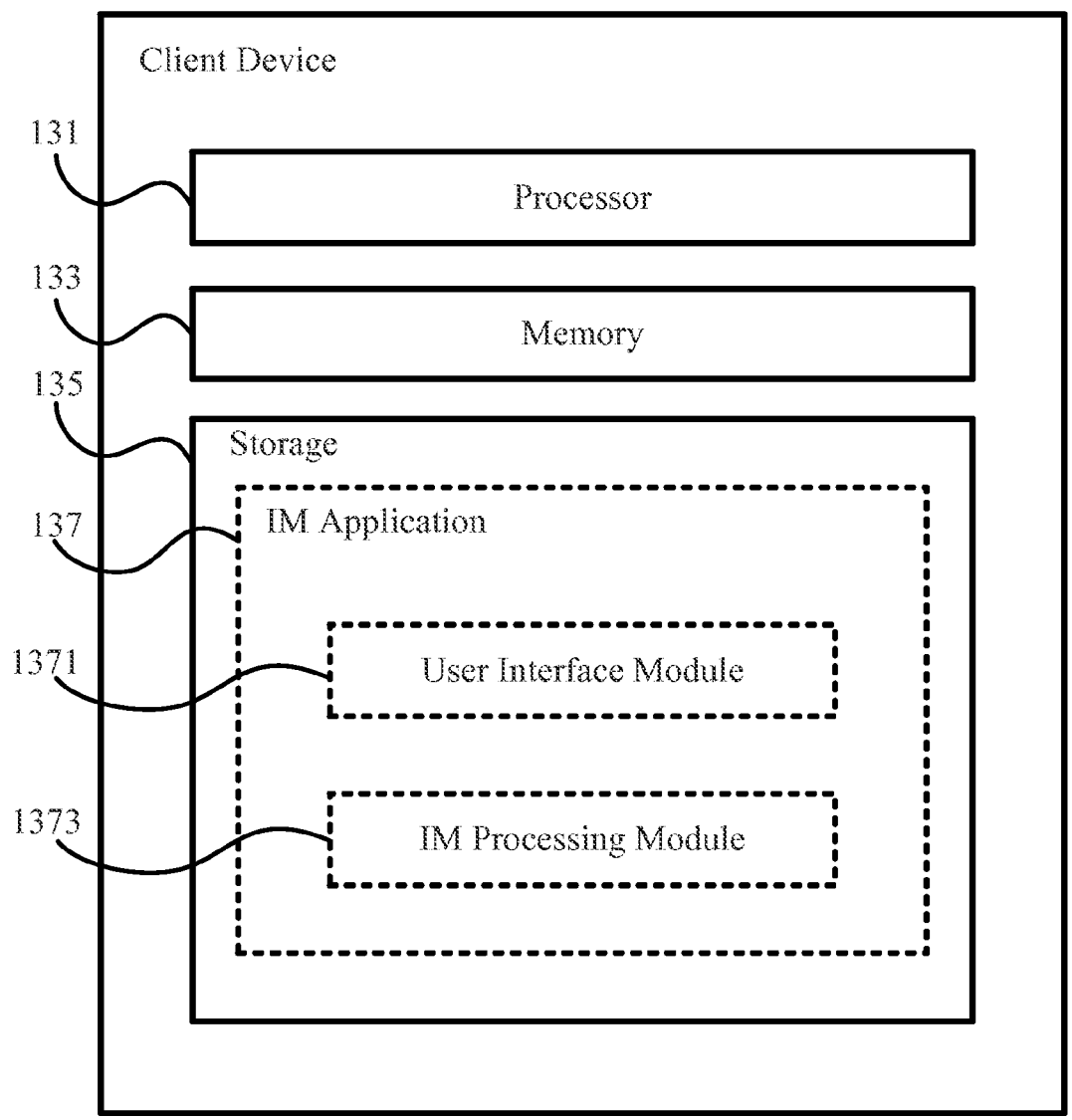
FIG. 2 schematically depicts a structure of a client device according to certain embodiments of the present disclosure.

FIG. 2 schematically depicts a structure of a client device 130 according to certain embodiments of the present disclosure, in which details of the IM application 137 is illustrated. As shown in FIG. 2, the IM application 137 includes a user interface module 1371, and an IM processing module 1373.

The user interface module 1371 provides a user interface available to a user such that the user may input an instant message or a command in the user interface, and perform operations such as viewing and sending outgoing instant messages and viewing incoming instant messages, through the user interface provided by the user interface module 1371. In certain embodiments, the user may operate the user interface to send an instant message request in order to establish an instant message channel between the client device 130 on which the user is operating and one or more target devices/users. For example, the user may select at least one service IM account or specific user name, which represents at least one service at the service device 150, and send an instant message request to the selected at least one service IM account or specific user name. The user interface module 1371 will then send the instant message request to the IM processing module 1373, which in turn sends the instant message request to the service IM application 157 of the service device 150 at which the at least one service is located. Upon receiving the request, an instant message communication channel may be established between the user and the at least one service IM account or specific user name. Once the instant message communication channel is established, the user interface module 1371 may display a message window within the user interface to the user. The user then may input and view outgoing message, and view the incoming message in the message window. In certain embodiments, the instant message may be a command instant message. In other words, the user may input at least one command through the user interface, such that the IM processing module 1373 of the IM application 137 may prepare the command instant message based on the at least one command received through the user interface. In certain embodiments, the user interface module 1371 may include a graphical user interface. When the IM application 137 is executed, the user interface module 1371 displays the graphical user interface on a display device (not shown) of the client device 130 such that the user may perform operation to the instant messages through the graphical user interface. In certain embodiments, the user interface module 1371 may include other types of user interface, such as a text-based interface, a voice operated interface, etc.

The IM processing module 1373 is configured to prepare one or more instant messages based on the user input received by the user interface, send the prepared one or more instant messages to the one or more IM servers 110, receive one or more instant messages from the one or more IM servers 110, and/or retrieve contents of the one or more instant messages for the user interface to show the contents to the user. For example, when the user inputs the command instant messages content through the user interface, and inputs a command to send the command instant message (clicking a "send" button of the message window of the user interface or pressing the "enter" key on the keyboard), the user interface module 1371 sends the content to the IM processing module 1373. In certain embodiments, the content is processed by the IM processing module 1373 to add corresponding information that is recognizable by the IM server 110 to prepare or form the command instant messages. Once the command instant messages is prepared, the IM processing module 1373 sends the command instant messages to the IM server 110. In certain embodiments, the IM processing module 1373 may receive instant messages from the IM server 110 following one or more predetermined rules. For example, the IM server 110 may "push" (i.e., initiate a request for the transaction of) the instant messages to the IM processing module 1373 when the IM server 110 receives a result instant messages from the service device 150. When the IM processing module 1373 receives the result instant message from the IM server 110, the IM processing module 1373 processes the result instant message to retrieve the result such that the result is viewable for the user through the user interface.

The service device 150 may be a computing device, such as a server computer, general purpose computer or a headless computer. In certain embodiments, the service device 150 may be a computer cluster, a cloud storage server, a web server, or any other devices that may be configured to have IM services. In certain embodiments, the service device 150 may be an SoC. As shown in FIG. 1A, the service device 150 has a processor 151, a memory 153, a storage 155, and any other necessary hardware components enabling the service device 150 to operate. In certain embodiments, the system 100 may include a plurality of service devices 150, as shown in FIG. 1B.

The processor 151 is configured to control operation of the service device 150. The processor 151 may execute an operation system or other applications of the storage 155. In certain embodiments, the storage 155 may run on more than one processor, such as two processors, four processors, eight processors, or any suitable number of processors.

The memory 153 may be a volatile memory, such as the RAM, for storing the data and information during the operation of the service device 150.

The storage 155 is a non-volatile data storage media for storing an OS (not shown), a service IM application 157, and other applications of the service device 150. The storage 155 may store the OS, the service IM application 157, and any other necessary software or firmware components executable at the processor 151. In certain embodiments, the OS, the service IM application 157, and any other necessary software or firmware components may be implemented as computer executable codes.

The service IM application 157 may be an IM client application for one or more services to process with instant messages, such as receiving and/or sending instant messages. As shown in FIG. 1A, the service IM application 157 is stored in the storage 155. Examples of the service IM application 157 may include but not limited to MSN Messenger from Microsoft Corp., Messenger from Facebook, WhatsApp Messenger from WhatsApp Inc., WeChat and Tencent QQ from Tencent Holdings Limited, Google+ from Google, Skype from Microsoft, API of Twitter, AOL Instant Messenger from AOL INC. etc. that may be customized for the services. In certain embodiments, the service IM application 157 may be a part of the OS of the service device 150 or a part of the firmware of the service device 150. In certain embodiments, the service IM application 157 may be a web application, such as a web browser connected to a web-based IM website that is customized for the services. Examples of the web-based IM website may include but not limited to imo.im, KoolIM, and eBuddy, etc., which may provide web-based one to one instant messaging or chatrooms. In certain embodiments, the service IM application 157 may be a completely customized IM application specialized for the system 100. In certain embodiments, the service device 150 may include two or more different service IM applications 157, where each of the two or more service IM applications 157 may be used to process with instant messages.

As described above, the service IM application 157 may be reached by one or more services, such as service 1 to service P as shown in FIG. 1A. Each of the services may have a specific IM identifier. In certain embodiments, the specific IM identifier may be a specific service IM account of the service 190, such as a specific user name of the service

190. For example, each of the services 190-1, 190-2, . . . 190-P may have a specific user name of service IM account 1, service IM account 2, . . . service IM account P.

Figure 3:
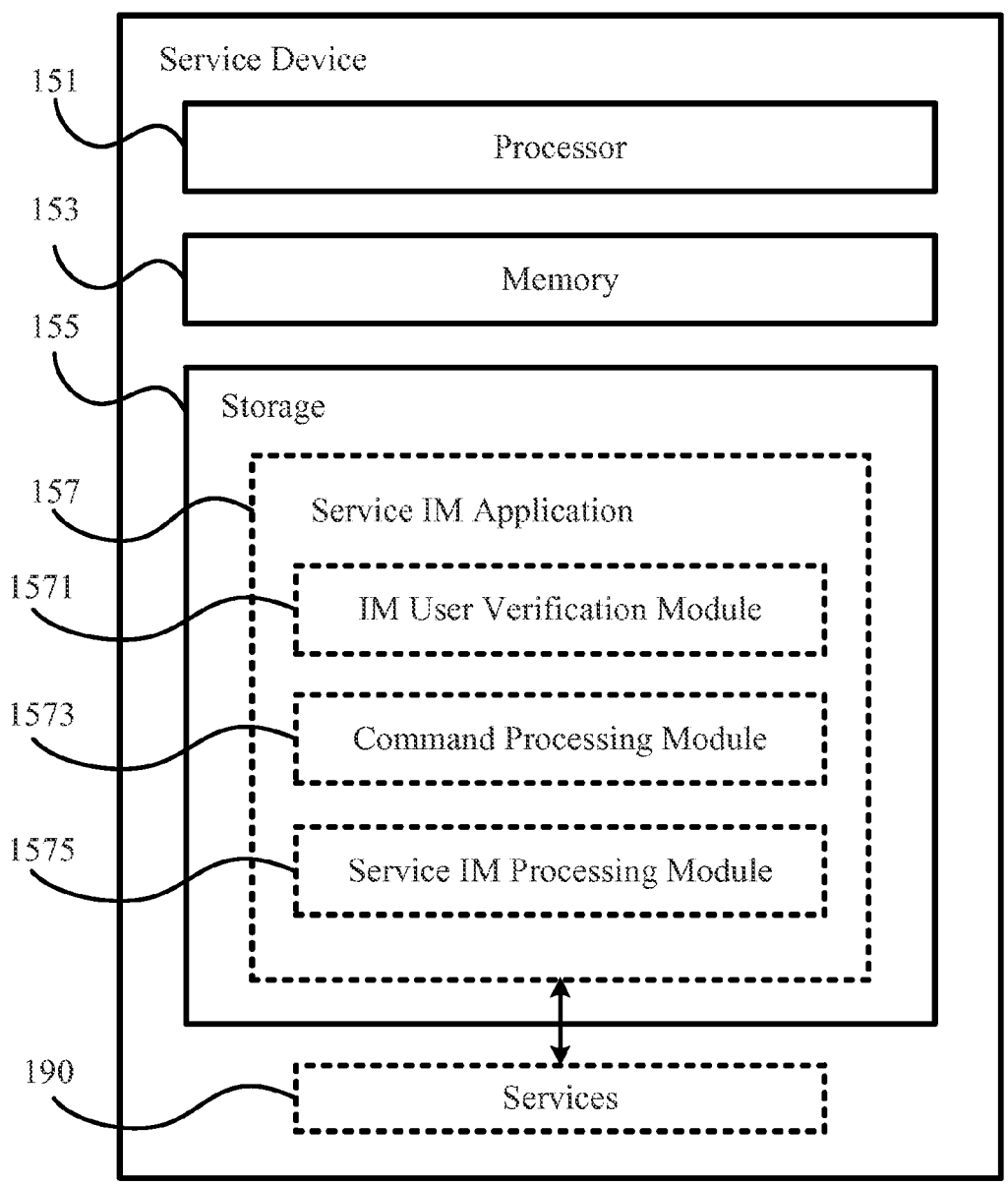
FIG. 3 schematically depicts a structure of a service device according to certain embodiments of the present disclosure.

FIG. 3 schematically depicts a structure of a service device 150 according to certain embodiments of the present disclosure, in which details of the service IM application 157 is illustrated. As shown in FIG. 3, the service IM application 157 includes an IM user verification module 1571, a command processing module 1573, and a service IM processing module 1575.

The IM verification module 1571 provides a security check for the user. When the service device 150 receives an instant message from a user, the IM user verification module 1571 may verify the features of the instant message, such as the IM identifier. If the IM identifier is verified as valid, the IM user verification module 1571 sends the positive verification result to the service IM processing module 1575. If the IM identifier is determined as invalid, the IM verification module 1571 sends the negative verification result to the service IM processing module 1575. In certain embodiments, the service device 150 may have a database, a file or a list that the IM verification module 1571 may use to compare with the IM identifier of the request.

The command processing module 1573 is configured to extract at least one command from the instant message, and send the at least one command to at least one corresponding service 190, such that the at least one service 190 performs a corresponding function based on the extracted at least one command. For example, when the service IM application 157 is executed, the service IM processing module 1575 sends the command instant message to the command processing module 1573, the command processing module 1573 extracts the at least one command from the command instant message, and then sends the extracted at least one command to the at least one of the services 190. Once the at least one service 190 receives the at least one command, the at least one service 190 performs a corresponding function based on the extracted command. The at least one command may be one command or a set of commands associated with the corresponding service 190.

Each of the services 190 is configured to perform associated functions. In certain embodiments, one service 190 may performs management of intelligent platform management interface (IPMI), the other service 190 may perform management of combined simple network management protocol (SNMP) and shell functions. When the at least one command is a set of commands, the service 190 may perform the set of commands in parallel or in serial corresponding to, for example the parameters related to the set of commands. The parameters may be inputted by the user during preparation of the instant message.

After the service 190 performs the function corresponding to the at least one command, the service 190 may generates a result, and send the result to the service IM processing module 1575. The result may include the information of whether the function is performed successfully. In certain embodiments, the result may include another one or a set of commands associated to another service of another service device.

The service IM processing module 1575 is configured to receive one or more incoming instant messages from the one or more IM servers 110, receive the result from the service 190, generate one or more outgoing instant messages based on the result, and send the one or more generated outgoing instant messages to the one or more IM servers 110. In certain embodiments, the generated outgoing instant message may be the result instant message, and the received instant message may be the command instant message. For example, when the service IM application 157 is executed, the service IM processing module 1575 may receive instant messages from the IM server 110 following one or more predetermined rules. Once the instant message is received, the service IM processing module 1575 may send the instant message to the IM user verification module 1571 for verification. When the verification is successful, the IM user verification module sends the verified instant message to the service IM processing module 1575, and the service IM processing module 1575 sends the verified instant message to the command processing module 1573. When the service 190 sends a result to the service IM processing module 1575, the service IM processing module 1575 may add corresponding information that is recognizable by the IM server 110 to generate the result instant message. Once the result instant message is generated, the service IM processing module 1575 sends the result instant message to the IM server 110. In certain embodiments, when the result is whether the function is accomplished successfully or not, the service IM processing module 1575 may send the result instant message to the sender/user of the command instant message, such that the result of the service is viewable by the user through the user interface of the user interface module 1371. When the result is another one or a set of commands, the service IM processing module 1575 may send the result instant message containing those commands to another service device having another service IM application, such that the service of the another service device may perform certain functions according to the command/commands stored in the result instant message. The IM server 110 used for receiving the command instant message and for sending the result instant message may or may not be the same IM server.

In another aspect, the present disclosure is related to a method of IM based communication channel for interacting with devices.

Figure 4A:
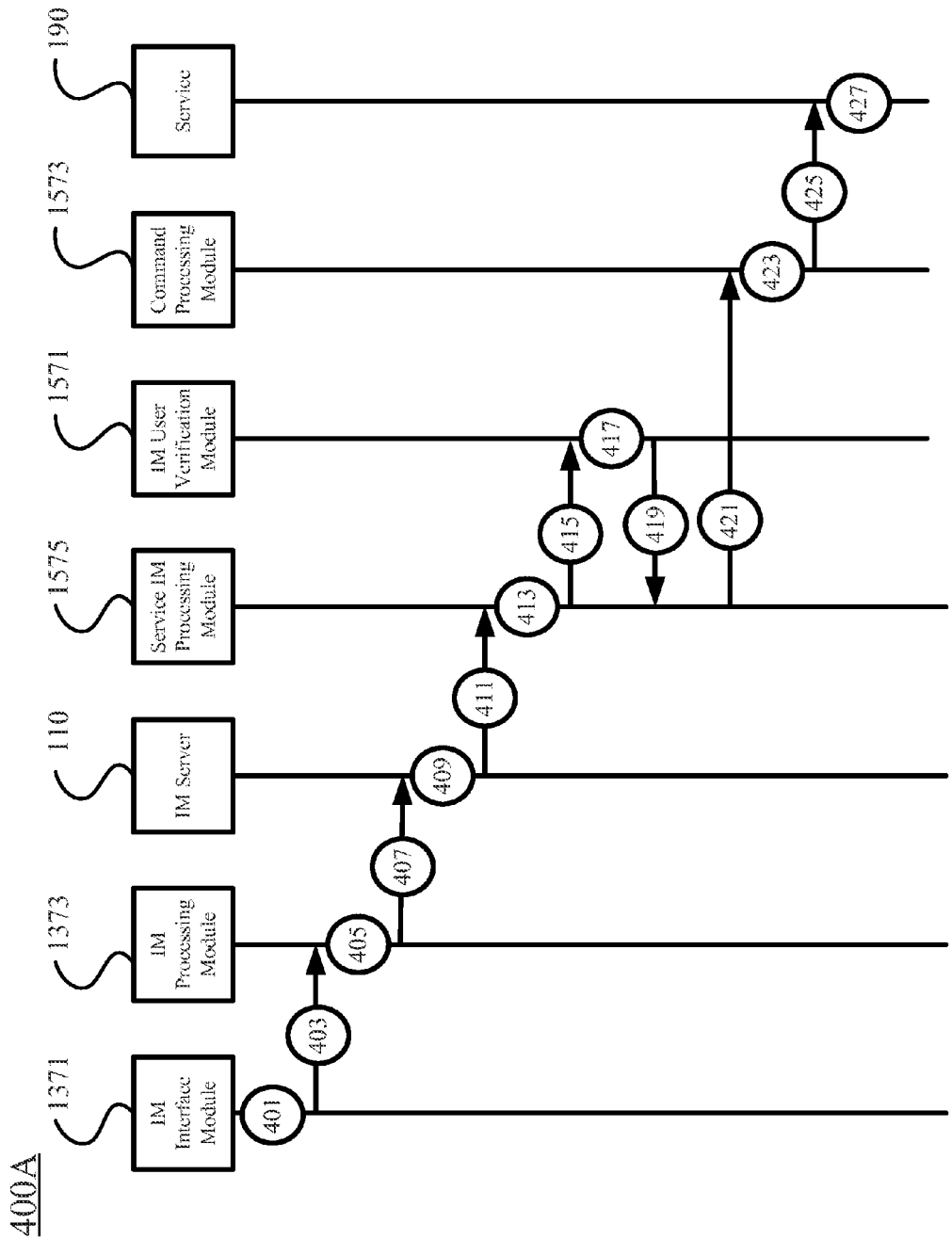
FIG. 4A schematically depicts a method of interacting with devices based on IM according to certain embodiments of the present disclosure.

FIG. 4A schematically depicts a method of interacting with devices based on IM according to certain embodiments of the present disclosure. In certain embodiments, the method 400A as described in FIG. 4A may be implemented by the system 100 as shown in FIGS. 1A and 1B.

Referring to FIG. 4A, when the user intends to perform a function to the service device 150, at operation 401, the user inputs, through the user interface provided by the user interface module 1371, a command instant message. The command instant message includes at least one command corresponding to a service 190 of the service device 150. In certain embodiments, the command instant message may be a text message, a voice message, a video message, or an attached file.

Optionally, in certain embodiments, before inputting the command instant message, the user need to establish an IM communication channel with the service IM application 157 of the service device 150. For example, the user may operate the user interface to send an instant message request to the corresponding service IM account or specific user name. The IM user verification module may then verify if the user IM account is a valid IM account. When the user IM account is verified, the corresponding service IM account accepts the request, such that a message window pops up in the user interface, indicating connection established between the user and the service IM account. In certain embodiments, the valid user IM accounts may be stored in a friend list of the service IM application 157. For example, an administrator may edit the features of the service IM application to add all the valid IM accounts into the friend list of the at least one service IM account of the service IM application. After the IM communication channel is established, as described above at operation 401, the user may input the command instant message from the message window of the user interface.

The user interface module 1371 receives the command instant message, and sends the command instant message to the IM processing module 1373 at operation 403. For example, when the user finishes inputting the at least one command instant message, and clicks a "send" button of the message window of the user interface or presses the "enter" key on the keyboard, the user interface module 1371 sends the input by the user to the IM processing module 1373. In certain embodiments, the user interface module 1371 sends the input of the user at real time, and does not require any specific operation such as clicking the "send" button or pressing the "enter" key.

Upon receiving the input from the user interface module 1371, at operation 405, the IM processing module 1373 prepares the command instant message according to the input by the user, such as adding service IM account or specific user name information to the command instant message.

Once the command instant message is prepared, at operation 407, the IM processing module 1373 sends the command instant message to the IM server 110.

The IM server 110 processes the command instant message at operation 409, and sends the command instant message to the service IM processing module 1575 at operation 411. In certain embodiments, when the service IM account for receiving the command instant message is offline, the IM server 110 may store the command instant message, and sends the command instant message when the service IM account logs-in the IM server 110.

Optionally, when the user and the service IM account communicate by P2P, the IM processing module 1373 may also send the command instant message directly to the service IM processing module 1575, and skip the operations 407-411.

At operation 413, the service IM processing module 1575 of the service IM application 157 of the service device 150 receives the command instant message from the IM server 110. In certain embodiments, both the IM processing module 1373 and the service IM processing module 1575 may use the same IM server 110. In certain embodiments, the IM processing module 1373 may use one IM server, the service IM processing module 1575 may use another IM server, and the two IM servers may be in communication directly or through one or more other IM servers in the network 170.

Upon receiving the command instant message, at operation 415, the service IM processing module 1575 sends the command instant message to the IM user verification module 1571 for verification.

At operation 417, the IM user verification module 1571 performs verification on the command instant message. In certain embodiment, the IM user verification module 1571 may verify the command instant message based on the instant message identifier. For example, the IM user verification module 1571 may verify if the instant message identifier is valid for further processing. In certain embodiments, the verification may include, but not limited to, comparing the instant message identifier of the command instant message with an instant message identifier list, a file having the list, or a database having the instant message identifier list. The valid instant message identifier may include IM account or specific user name of certain users. In other embodiments, the valid instant message identifier may include the IP address of the client device 130 that is used by the IM account.

When the IM user verification module 1571 determines that the command instant message is a valid instant message, at operation 419, the IM user verification module 1571 sends the verified command instant message to the service IM processing module 1575 for further processing. When the IM user verification module 1571 determines that the command instant message is not a valid instant message, the IM user verification module 1571 may perform corresponding caution operation to the invalid command instant message, such as discarding the invalid instant message.

Optionally, the administrator may perform the verification manually, for example, by editing the friend list of the service IM account or the specific user name in advance, and only the user account listed in the friend list are allowed to have IM communication with the service IM account of the service IM application 157. In certain embodiments, the service IM application may not need the IM user verification module 1571. When verification is not required or the administrator perform the verification manually, operations 415-419 may be skipped, and the service IM processing module 1575 sends the command instant message directly to the command processing module 1573.

Upon receiving the verified command instant message, at operation 421, the service IM processing module 1575 sends the command instant message to the command processing module 1573.

When the command processing module 1573 receives the command instant message, at operation 423, the command processing module 1573 extracts the at least one command from the command instant message. The at least one command may be associated with at least one service 190.

At operation 425, the command processing module 1573 sends the extracted at least one command to the service 190.

At operation 427, the corresponding service 190 then performs a function based on the extracted at least one command.

In certain embodiments, the service 190 performing the function generates a result based on the performance of the function. In certain embodiments, the result may include information of whether the function is performed successfully or not. In certain embodiments, the result may include one or more commands associated with another service of another service device.

Figure 4B:
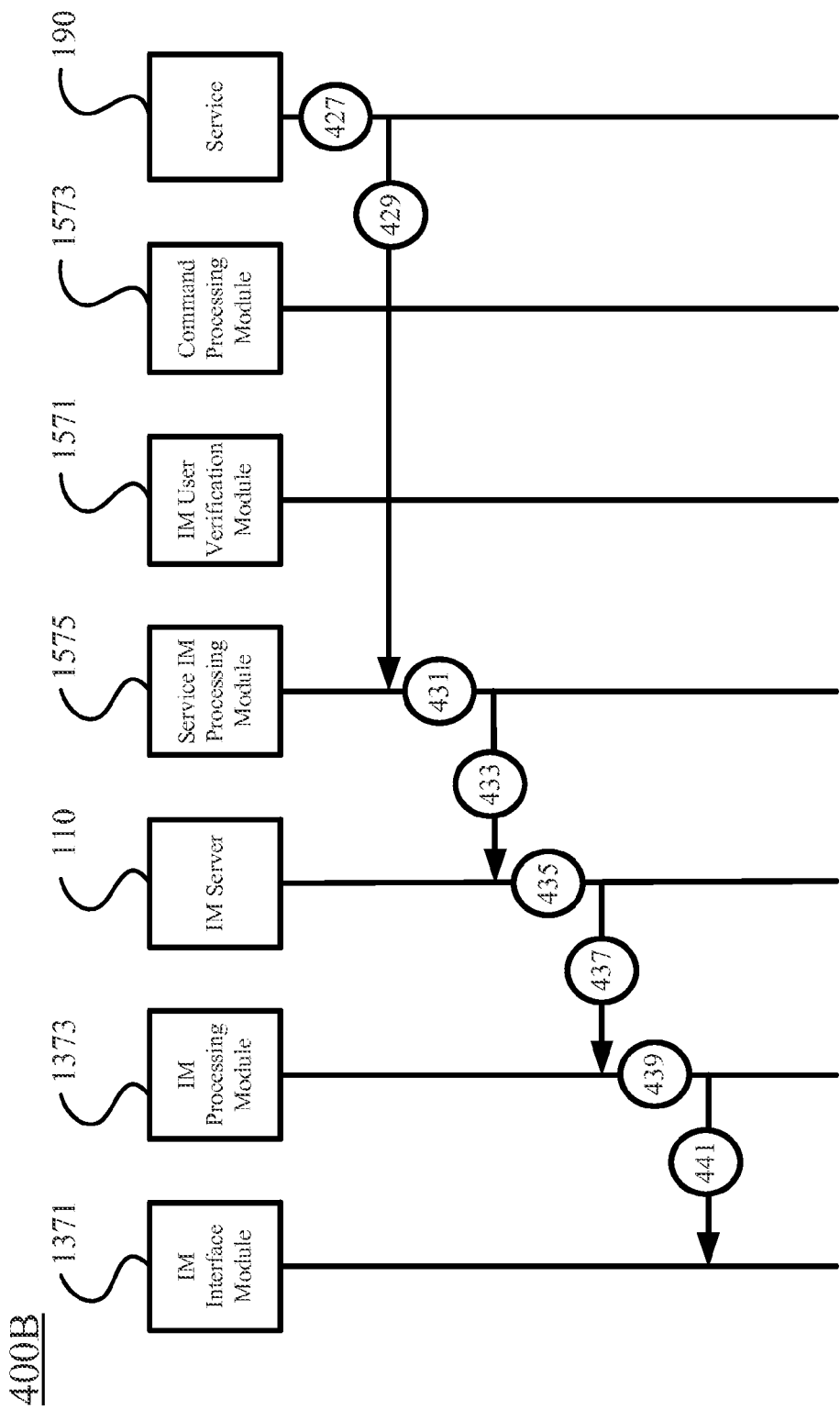
FIG. 4B schematically depicts a method of interacting with devices based on IM according to certain embodiments of the present disclosure.

FIG. 4B schematically depicts a method of interacting with devices based on IM according to certain embodiments of the present disclosure, where the result is, for example, whether the function is performed successfully or not. In certain embodiments, the method 400B as described in FIG. 4C may be implemented by the system 100 as shown in FIGS. 1A and 1B.

Referring to FIG. 4B, when the service 190 performs a function and generates a result, at operation 429, the service 190 sends the result to the service IM processing module 1575.

Upon receiving the result from the service 190, at operation 431, the service IM processing module 1575 generates a result instant message including the received result. When the result is the information whether the function is performed successfully or not, the generated result instant message may have the IM identifier of the user that sent the command instant message. In other embodiments, when the result is one or more commands, the generated result instant message may have the IM identifier of another service located at another service device associated with the one or more commands.

Once the result instant message is prepared and ready to be sent to the client device 130, at operation 433, the service IM processing module 1575 sends the result instant message to the IM server 110. At the IM server 110, the IM server 110 processes the result instant message at operation 435. At operation 437, the IM server 110 sends the result instant message to the IM processing module 1373.

Optionally, when the client device 130 and the service device 150 communicates by P2P, the service IM processing module 1575 may send the result instant message directly to the IM processing module 1373, and skip the operations 433-437.

At operation 439, the IM processing module 1373 processes the result instant message.

At operation 441, the IM processing module 1373 sends the result instant message to the user interface module 1371, such that the result is viewable by the user through the user interface provided by the user interface module 1371.

In certain embodiments, if the result instant message includes at least one second command associated with a second service, the result instant message may also be sent to a second service device that has the second service. The second service device may have a similar service IM application, and configured to perform a corresponding second function based on the at least one second command extracted from the result instant message. The operations of the above function in the second service device may be similar to the operations 411 to 427 as described above and shown in FIG. 4A.

Figure 5:
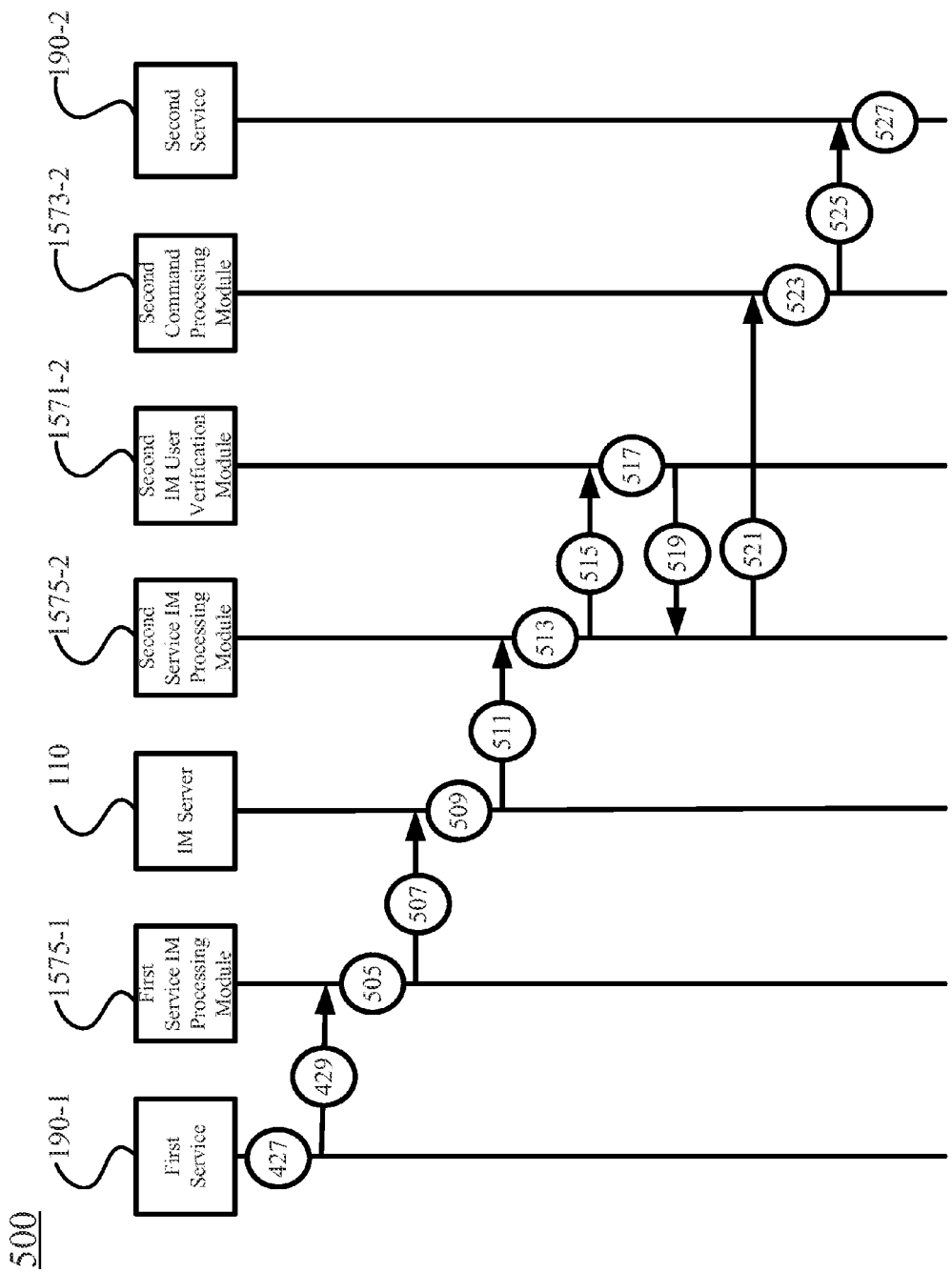
FIG. 5 schematically depicts a method of interacting with devices based on IM according to certain embodiments of the present disclosure.

FIG. 5 schematically depicts a method of interacting with devices based on IM according to certain embodiments of the present disclosure, where the result is, for example, at least one second command.

In certain embodiments, the method 500 as described in FIG. 5 may be implemented by the system 100 as shown in FIGS. 1A and 1B, with at least a first service device 150-1 and a second service device 150-2. The first service device 150-1 has a first service IM processing application 157-1 and a first service 190-1. The second service device 150-2 has a second service IM processing application 157-2 and a second service 190-2. The first service IM processing application 157-1 has a first IM user verification module 1571-1, a first command processing module 1573-1, and a first service IM processing module 1575-1. The second service IM processing application 157-2 has a second IM user verification module 1571-2, a second command processing module 1573-2, and a second service IM processing module 1575-2.

As shown in FIG. 4B, at operation 427, the first service 190-1 performs the first function based on the at least one first command. When the first service 190-1 performs the first function and generates the first result, at operation 429, the first service 190-1 sends the first result to the first service IM processing module 1575-1.

Upon receiving the result from the first service 190-1, at operation 505, the IM processing module 1373 prepares the result instant message according to the result, such as adding service IM account information of the second service 190-2 to the command instant message.

Once the first result instant message is prepared, at operation 507, the first IM processing module 1575-1 sends the result instant message to the IM server 110.

Optionally, in certain embodiments, before sending the result instant message to the IM server 110, the first service IM application 157-1 may need to establish an IM communication channel with the second service IM application 157-2 of the service device 150. For example, the first service account or the corresponding specific user name of the first service IM application 157-1 may send an instant message request to the second service account of the second service IM account application 157-2. The second IM user verification module 1571-2 may then verify if the first service IM account is a valid IM account. When the first service IM account is verified, the corresponding second service IM account accepts the request, to establish an IM channel between the first service IM account operating on the first service device 150-1 and the second service IM account operating on the second service device 150-2. In certain embodiments, the valid service IM accounts may be stored in a friend list of the second service IM application 157-2. For example, an administrator may edit the features of the second service IM application 157-2 to add all the valid IM accounts into the friend list of the at least one service IM account of the second service IM application 157-2. After the IM communication channel is established, the first service IM processing module 1575-1 may send the result instant message to the IM server 110.

The IM server 110 processes the result instant message at operation 509, and sends the first result instant message to the second service IM processing module 1575-2 at operation 511. In certain embodiments, both the first service IM processing module 1575-1 and the second service IM processing module 1575-2 may use the same IM server 110. In certain embodiments, the first service IM processing module 1575-1 may use one IM server, the second service IM processing module 1575-2 may use another IM server, and the two IM servers may be in communication directly or indirectly through one or more other IM servers in the network 170.

Optionally, when the first service IM account and the second service IM account communicate by P2P, the first service IM processing module 1575-1 may also send the result instant message directly to the second service IM processing module 1575-2, and skip the operations 507-511.

Upon receiving the result instant message, at operation 513, the second service IM processing module 1575-2 processes the result instant message, and at operation 515, sends the processed result instant message to the second IM user verification module 1571-2 for verification.

At operation 517, the second IM user verification module 1571-2 performs verification on the result instant message. In certain embodiment, the second IM user verification module 1571-2 may verify the result instant message based on the instant message identifier. For example, the second IM user verification module 1571-2 may verify if the instant message identifier is valid for further processing. In certain embodiments, the verification may include, but not limited to, comparing the instant message identifier of the result instant message with an instant message identifier list, a file having the list, or a database having the instant message identifier list. The valid instant message identifier may include IM account of certain users/services. In other embodiments, the valid instant message identifier may include the IP address of the client device 130 or service device 150 that is used by the IM account.

When the second IM user verification module 1571-2 determines that the result instant message is a valid instant message, at operation 519, the second IM user verification module 1571-2 sends the verified result instant message to the second service IM processing module 1575-2 for further processing. When the second IM user verification module

1571-2 determines that the result instant message is not a valid instant message, the second IM user verification module 1571-2 may perform corresponding caution operation to the invalid result instant message, such as discarding the invalid instant message.

Optionally, the administrator may perform the verification manually, for example, by editing the friend list of the second service IM account in advance. In certain embodiments, the second service IM application 157-2 may not need the second IM user verification module 1571-2. When verification is not required or the administrator perform the verification manually, operations 515-519 may be skipped, and the second service IM processing module 1575-2 sends the result instant message directly to the second command processing module 1573-2.

At operation 521, the second service IM processing module 1575-2 sends the verified result instant message to the second command processing module 1573-2.

When the second command processing module 1575-2 receives the result instant message, at operation 523, the second command processing module 1575-2 extracts the at least one second command from the result instant message. The at least one second command may be associated with the at least one second service 190-2.

At operation 525, the second command processing module 1575-2 sends the extracted at least one second command to the at least one second service 190-2.

At operation 527, the corresponding at least one second service 190-2 then performs a second function based on the extracted at least one second command.

In certain embodiments, the second service 190-2 performing the second function generates a second result based on the performance of the second function. In certain embodiments, the second result may include information of whether the second function is performed successfully or not. In certain embodiments, the second result may include one or more third commands associated with a third service of a third service device.

In a further aspect, the present disclosure is related to a non-transitory computer readable medium storing computer executable code. The code, when executed at one or more processor of a service device 150 or/and a client device 130, may perform the method as described above. In certain embodiments, the non-transitory computer readable medium may include, but not limited to, the storage device 155 as described above, or any other storage media of the service device 150.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope. Accordingly, the scope of the present disclosure is defined by the appended claims rather than the foregoing description and the exemplary embodiments described therein.

What is claimed is:

1. A system, comprising:
a first service device and a second service device, each comprising one or more processors and a service instant messaging (IM) application, the first service device having at least one first service and at least one first service IM account, the second service device having at least one second service and at least one second service IM account,
wherein the service IM application of the first service device, when executed at the one or more processors of the first service device, is configured to:
receive at least one command instant message from at least one IM server via a network, wherein the at least one command instant message comprises at least one first command associated with the at least one first service;
verify the at least one command instant message based on an IM identifier of the command instant message;
extract the at least one first command from the at least one command instant message;
send the extracted first command to the at least one first service such that the at least one first service performs a corresponding first function based on the extracted first command;
receive a result from the at least one first service performing the first function, wherein the result comprises a second command;
generate a result instant message comprising the result, wherein the result instant message is subject to be sent to the second service device;
establish a communication channel between the service IM application of the first service device and the service IM application of the second device; and
send the result instant message to the at least one IM server such that the at least one IM server sends the result instant message to the second service device;
wherein the service IM application of the second service device, when executed at the one or more processors of the second service device, is configured to, in response to receiving the result instant message from the at least one IM server:
extract the at least one second command from the result instant message; and
send the extracted second command to the at least one second service such that the at least one second service performs a corresponding second function based on the extracted second command; and
wherein the at least one first service and the at least one second service have different service IM application identifiers, and each of the different service IM application identifiers is one service IM account from (a) at least one first service IM account and (b) the at least one second service IM account.

2. The system of claim 1, wherein the service IM application of the first service device comprises:
an IM user verification module, configured to verify the at least one command instant message based on the IM identifier of the at least one command instant message;
a command processing module, configured to extract the at least one first command from the at least one command instant message and send the extracted first command to the at least one first service such that the at least one first service performs the corresponding first function based on the extracted first command; and a service IM processing module, configured to receive the at least one command instant message, receive the result, generate the result instant message, and send the result instant message.

3. The system of claim 1, further comprising:
at least one client device, each client device comprising one or more processors and an IM application, wherein the IM application, when executed at the one or more processors of the client device, is configured to:
provide a user interface configured to receive the at least one command;
prepare the at least one command instant message; and
send the at least one command instant message.

4. The system of claim 3, wherein the IM application of the at least one client device comprises:
a user interface module, configured to provide the user interface; and
an IM processing module, configured to prepare the at least one command instant message, send the at least one command instant message, receive the result instant message, and retrieve the result from the result instant message.

5. The system of claim 1, wherein the at least one first service comprises management of IPMI, or management of combined SNMP and shell functions.

6. A method of performing instant messaging (IM) based communication in a system, the method comprising:
receiving, at a service IM application being executed at a first service device comprising at least one first service IM account, a command instant message, wherein the command instant message comprises at least one first command associated with at least one first service of the first service device;
verifying, at the service IM application of the first service device, the command instant message based on the IM identifier of the command instant message;
extracting, at the service IM application of the first service device, the at least one first command from the command instant message;
sending, by the service IM application of the first service device, the extracted first command to the at least one first service such that the at least one first service performs a corresponding first function based on the extracted first command;
receiving a result from the at least one first service performing the first function, wherein the result comprises at least one second command;
generating a result instant message comprising the result, wherein the result instant message is subject to be sent to a second service device, and the second service device comprises a second service, at least one second service IM account and the service IM application;
establishing a communication channel between the service IM application of the first service device and the service IM application of the second device;
sending the result instant message to at least one IM server such that the IM server sends the result instant message to the second service device; and
performing, by the second service of the second service device, a corresponding second function based on the second command in response to receiving the result instant message from the at least one IM server,
wherein the at least one first service and the at least one second service have different service IM application identifier, and each of the different service IM application identifiers is one service IM account from (a) the at least one first service IM account and (b) the at least one second service IM account.

7. The method of claim 6, wherein the service IM application of the first service device comprises:
an IM user verification module, configured to verify the command instant message based on the IM identifier of the command instant message;
a command processing module, configured to extract the at least one first command from the command instant message and send the extracted first command to the at least one first service such that the at least one first service performs the corresponding first function based on the extracted first command; and
a service IM processing module, configured to receive the at least one command instant message, receive the result, generate the result instant message, and send the result instant message.

8. The method of claim 6, wherein the system further comprises at least one client device, each client device comprising one or more processors and an IM application, wherein the IM application, when executed at the one or more processors of the client device, is configured to:
provide a user interface configured to receive the at least one command;
prepare the command instant message; and
send the command instant message.

9. The method of claim 8, wherein the IM application of the at least one client device comprises:
a user interface module, configured to provide the user interface; and
an IM processing module, configured to prepare the command instant message, send the command instant message, receive the result instant message, and retrieve the result from the result instant message.

10. A non-transitory computer readable medium storing computer executable code, wherein the code, when executed at one or more processors of a first service device, is configured to:
receive a command instant message, wherein the command instant message comprises at least one first command associated with at least one first service of the first service device comprising at least one first service IM account;
verify the command instant message based on an IM identifier of the command instant message;
extract the at least one first command from the command instant message;
send the extracted first command to the at least one first service such that the at least one first service performs a corresponding first function based on the extracted first command;
receive a result from the at least one first service performing the first function, wherein the result comprises at least one second command;
generate an result instant message comprising the result, wherein the result instant message is subject to be sent to a second service device, and the second service device comprises at least one second service and at least one second service IM account;
establish a communication channel between the service IM application of the first service device and the service IM application of the second device;
send the result instant message to at least one IM server such that the IM server sends the result instant message to the second service device,
receive the result instant message from the at least one IM server;

extract the at least one second command from the result instant message; and send the extracted at least one second command to the at least one second service such that the at least one second service performs a corresponding second function based on the second command, wherein the at least one first service and the at least one second service have different service IM application identifier, and each of the different service IM application identifiers is one service IM account from (a) the at least one first service IM account and (b) the at least one second service IM account.

11. The non-transitory computer readable medium of claim 10, wherein the code comprises:

an IM user verification module, configured to verify the command instant message based on the IM identifier of the command instant message;

a command processing module, configured to extract the at least one first command from the command instant message and send the extracted first command to the at least one first service such that the at least one first service performs the corresponding first function based on the extracted command; and a service IM processing module, configured to receive the command instant message, receive the result, generate the result instant message and send the result instant message.

12. The non-transitory computer readable medium of claim 10, wherein the first service device is remotely connected to at least one client device through a network, each client device comprising one or more processors and an IM application, wherein the IM application, when executed at the one or more processors of the client device, is configured to:

provide a user interface configured to receive the at least one command;

prepare the command instant message; and send the command instant message.

13. The non-transitory computer readable medium of claim 12, wherein the IM application of the client service device comprises:

a user interface module, configure to provide the user interface;

an IM processing module, configured to prepare the command instant message, send the command instant message, receive the result instant message, and retrieve the result from the result instant message.

14. The system of claim 1, wherein the establish the communication channel between the service IM application of the first service device and the service IM application of the second device comprises:

sending an instant message request from the at least one first service IM account to the at least one second service IM account;

verifying the at least one first service IM account to be a valid IM account by a second IM user verification module of the second service device;

accepting the instant message request by the at least one second service IM account; and establishing the communication channel between the service IM application of the first service device and the service IM application the second service device.

15. The method of claim 6, wherein the establishing the communication channel between the service IM application of the first service device and the service IM application of the second device comprises:

sending an instant message request from the at least one first service IM account to the at least one second service IM account;

verifying the at least one first service IM account to be a valid IM account by a second IM user verification module of the second service device;

accepting the instant message request by the at least one second service IM account; and establishing the communication channel between the service IM application of the first service device and the service IM application the second service device.

16. The non-transitory computer readable medium of claim 10, wherein the establish the communication channel between the service IM application of the first service device and the service IM application of the second device comprises:

sending an instant message request from the at least one first service IM account to the at least one second service IM account;

verifying the at least one first service IM account to be a valid IM account by a second IM user verification module of the second service device;

accepting the instant message request by the at least one second service IM account; and establishing the communication channel between the service IM application of the first service device and the service IM application the second service device.

* * * * *